US006366961B1

(12) United States Patent
Subbiah et al.

(10) Patent No.: US 6,366,961 B1
(45) Date of Patent: Apr. 2, 2002

(54) METHOD AND APPARATUS FOR PROVIDING MINI PACKET SWITCHING IN IP BASED CELLULAR ACCESS NETWORKS

(75) Inventors: Baranitharan Subbiah, Sunnyvale, CA (US); Senthil Sengodan, Woburn, MA (US)

(73) Assignee: Nokia Telecommunications, Oy, Espoo (FI)

(*) Notice: Subject to any disclaimer, the term of this patent is extended or adjusted under 35 U.S.C. 154(b) by 0 days.

(21) Appl. No.: 09/262,148

(22) Filed: Mar. 3, 1999

(51) Int. Cl.⁷ .................. G06F 15/173; H04L 12/46
(52) U.S. Cl. ............... 709/238; 709/242; 709/249; 370/352; 370/353; 370/354; 370/355
(58) Field of Search ................. 709/238, 242, 709/249; 370/352, 353, 354, 355

(56) References Cited

U.S. PATENT DOCUMENTS

| | | | | |
|---|---|---|---|---|
| 5,398,245 A | * | 3/1995 | Harriman, Jr. ........... | 370/389 |
| 5,602,841 A | * | 2/1997 | Lebizay et al. ........... | 370/413 |
| 5,781,549 A | * | 7/1998 | Dai ......................... | 370/398 |
| 6,032,190 A | * | 2/2000 | Bremer et al. ........... | 709/238 |
| 6,041,054 A | * | 3/2000 | Westberg ................. | 370/389 |
| 6,101,182 A | * | 8/2000 | Sistanizadeh et al. .... | 370/352 |
| 6,182,146 B1 | * | 1/2001 | Graham-Cumming, Jr. | 709/238 |

OTHER PUBLICATIONS

Subbiah et al., "User Multiplexing in RTP payload between IP Telephony Gateways," Internet Draft, Aug. 1998 p. 2 and p. 6.

Mauger et al., "ATM Adaptation Layer Switching," ISS World Telecommunications Congress (International Switching Symposium) CA Toronto, Pinnacle Group, Sep. 21, 1997, pp. 207–214.

(List continued on next page.)

Primary Examiner—Krisna Lim
(74) Attorney, Agent, or Firm—Altera Law Group, LLC (57) ABSTRACT

A method and apparatus for providing mini packet switching in IP networks, e.g., IP based cellular access networks and IP telephony (IPTEL) gateway networks. The method and apparatus provide a signaling scheme that establishes a connection between the source and destination node, wherein channels at each intermediate node are associated for a single end-to-end connection. This enables demultiplexing and multiplexing mini packets at intermediate nodes in a RAN and CN. The method includes receiving a payload at a node, the payload including a plurality of multiplexed mini packets, each mini packet having a header, wherein the header identifies a user and a connection associated therewith, demultiplexing the mini packets, analyzing the header of each mini packet to determine a processing for the mini packet and multiplexing packets having a common next hop in a new RTP payload. The analyzing further includes identifying mini packets destined for a local user, the method further comprising transferring the mini packet to the local user. The method further includes transmitting the new payload to the common next hop. A local channel identification table is updated to provide the necessary route selection in a mini packet switching system.

26 Claims, 7 Drawing Sheets

OTHER PUBLICATIONS

Subbiah et al., "ATM adaptation layer 2 (AAL2) for low bit rate speech and data: issues and challenges," IEEE ATM Workshop Proceeding, XX, XX, 1998, pp. 225–233.

Casner, S. et al., "Compressing IP/UDP/RTP Headers for Low–Speed Serial Links", Internet at http://search.ietf.org/internet–drafts/draft–ietf–avt–crpt–05.txt, 10 pages (Jul. 27, 1998).

ITU–T, 1.363.2: B–ISDN ATM Adaptation Layer Specification: Type 2 AAL, 50 pages (Sep. 1997).

ITU–T, 1.366.1: Segmentation and Reassembly Service Specific Convergence Sublayer for the AAL Type 2, 37 pages (Jun. 1998).

Rosenberg, J. et al., "An RTP Payload Format for User Multiplexing", Internet at http://search.ief.org/internet . . . aft–ietf–avt–aggregation–00.txt, 10 pages (May 6, 1998).

Schulzrinne, H. et al., "RTP: A Transport Protocol for Real–Time Applications", Internet at http://info.internet.isi.edu:80/in–notes/rfc/files/rfc1889.txt, 65 pages (Jan. 1996).

Subbiah, B. et al., "ATM Adaptation Layer 2 (AAL2) for Low Bit Rate Speech and Data: Issues and Challenges", 1998 IEEE ATM Workshop Proceedings, George Mason University, Fairfax, VA, pp. 225–233, (May 26–29, 1998).

Subbiah, B. et al., "User Multiplexing in RTP payload between IP Telephony Gateways", Internet at http://www.fokus.gmd.de/research/cc/glone/projects/ipt/playe . . . /draft–ietf–avt–mux–rtp–00.tx, 17 pages (Aug. 21, 1998).

* cited by examiner

| Incoming UDP port | Incoming CID | Outgoing UDP port | Outgoing CID | Calling UID | Called UID |
|---|---|---|---|---|---|
| $X_1$ | $C_1$ | $X_2$ | $C_2$ | $UID_1$ | $UID_2$ |
| - | - | - | - | - | - |
| | | | | | |
| | | | | | |
| | | | | | |

Fig. 7

METHOD AND APPARATUS FOR PROVIDING MINI PACKET SWITCHING IN IP BASED CELLULAR ACCESS NETWORKS

BACKGROUND OF THE INVENTION

1. Field of the Invention.

This invention relates in general to a communication systems, and more particularly to a method and apparatus for providing mini packet switching in IP based networks, such as IP based cellular access networks and IP telephony (IPTEL) gateway networks.

2. Description of Related Art.

An Internet is a set of networks connected by gateways, which are sometimes referred to as routers. The Internet Protocol (IP) is a network layer protocol that routes data across an Internet. The Internet Protocol was designed to accommodate the use of host and routers built by different vendors, encompass a growing variety of growing network types, enable the network to grow without interrupting servers, and support higher-layer of session and message-oriented services. The IP network layer allows integration of Local Area Network "islands".

The Internet not only provides a medium for data transport, but also has developed as a medium for telecommunications. In fact, IP telephony is maturing as a technology and a service, which places it in direct conflict with the conventional public telephone network. New types of IP telephony equipment are being introduced and small Internet service providers and niche carriers are beginning to offer IP telephony services.

There are some very clear trends emerging in the communications world. For example, there is a clear trend in the increase in mobile penetration, the rise in Internet usage, and a growing interest in voice over the Internet and VoIP services. Accordingly, it comes as no surprise that the cellular industry is working on services offerings that take advantage of these trends. However, substantial investment is required and methods for upgrading mobile networks to cope with increasing IP traffic must be developed. Nevertheless, the growth in packet data traffic looks to continue, thereby making IP hard to disregard.

The technologies for upgrading mobile networks are here, or at least very nearly. For example, with respect to GSM, the packet upgrade is GPRS (global packet radio services), and in CDMA, Phase B Data services promise to bring packet functionality. Meanwhile wireless access protocol (WAP) promises to provide the important middleware element.

Anticipating this growth, many cellular equipment manufacturers are seriously considering an IP based transport technology in the cellular access and core networks. Mobile telephony is currently the dominant application in a cellular network and it is expected to remain so for many more years. Due to the resource limitation in the air interface, speech compression methods are implemented in the mobile terminal. The average packet size of current speech coders is in the range of 10 bytes. When such a small packet is transported using IP or ATM layers, a huge overhead is incurred due to transport layer headers. When the compressed speech packets arrive at the Base Station (BS), it is transported in the radio access network either to the Radio Network Controller (RNC) or to the Mobile Switching Center (MSC) based on the destination address. ATM Adaptation layer 2 (AAL2), a multiplexing scheme at the ATM cell level, has been standardized by the International Telecommunications Union-Telecommunications Standardization Sector (ITU-T) to carry compressed speech in an ATM environment. The main problem in transporting the small packets in a regular RTP based IP telephony model is the large amount of overhead due to RTP/UDP/IP headers.

A telephone call between users is typically carried by a separate Real-time Transport Protocol/User Datagram Protocol/Internet Protocol (RTP/UDP/IP) connection. RTP is an Internet protocol for transmitting real-time data such as audio and video. RTP itself does not guarantee real-time delivery of data, but it does provide mechanisms for the sending and receiving applications to support streaming data. Typically, RTP runs on top of the UDP protocol, although the specification is general enough to support other transport protocols. The User Datagram Protocol is a connectionless protocol that, like TCP, runs on top of IP networks. Unlike TCP/IP, UDP/IP provides very few error recovery services, offering instead a direct way to send and receive datagrams over an IP network.

IP telephony gateways provide an interface between the existing circuit switched telephone networks (such as PSTN and GSM) and the packet switched IP data networks. In traditional IP telephony applications, telephone calls between PSTN users interconnected by a pair of IP telephony gateways to compress incoming PSTN speech samples generate packets with sizes ranging from 5 to 20 bytes per speech sample.

For example, G.723.1 (the most popular IP telephony codec and the International Multimedia Teleconferencing Consortium's (IMTC) Voice over IP (VoIP) mandatory low bit-rate codec), generates a 20 byte speech packet at 30 ms intervals. Many codecs used in cellular environment generate less than 10 byte packet per speech sample. Small size packets are subjected to large overhead when transferred using the Real time Transport Protocol (RTP). The RTP/UDP/IP overhead is 40 bytes (12+8+20) for a simple speech packet. For example, a 10 byte packet transferred via RTP/UDP/IP increases the overhead to 80% (40 byte overhead/50 byte overhead plus packet). In addition, for each call request a single UDP/IP connection (a pair of UDP ports) is established between the gateways requiring a large state (memory) to be maintained at the telephony gateways, thereby making these less scaleable.

Co-pending and commonly assigned U.S. Pat. application Ser. No. 09/137,276, filed on Aug. 20, 1998, by Baranitharan Subbiah, entitled METHOD AND APPARATUS FOR PROVIDING EFFICIENT USER MULTIPLEXING IN A REAL-TIME PROTOCOL PAYLOAD FOR TRANSPORTING COMPRESSED SPEECH BETWEEN IP TELEPHONY GATEWAYS, which is hereby incorporated by reference, discloses an efficient real-time transport protocol multiplexing method and apparatus for transporting compressed speech between IP telephony gateways. Subbiah includes creating a header for a plurality of data packets, wherein each header provides identification of a user associated with a packet. Then, each header is added to the data packet associated therewith to form mini-IP payloads. The mini-IP payloads are multiplexed into a RTP payload and the RTP payload is transmitted over a single RTP/UDP/IP connection. Thus, Subbiah multiplexes a number of users in to a single RTP/UDP connection. However, Subbiah is applicable only between a pair of nodes.

An IP based Radio Access Network (RAN) or Core Network (CN) requires that the solution proposed by Subbiah be extended so that it can be used for switching the mini packets. For example, a RAN consists of many BSs and RNCs. At any given time, there are several calls between any two network elements in the RAN and these calls are transferred via one or more intermediate network elements.

It can be seen then that there is a need for a new method which will allow mini packets belonging to several users that are received on incoming links to be multiplexed prior to sending it out on an outgoing link to maximize the efficiency of links between any two network elements.

It can also be seen that there is a need for a signaling scheme that establishes a connection between the source and destination node, wherein channels at each intermediate node are associated for a single end-to-end connection.

It can also be seen that there is a need for a method that enables demultiplexing and multiplexing mini packets at intermediate nodes in a RAN and CN.

SUMMARY OF THE INVENTION

To overcome the limitations in the prior art described above, and to overcome other limitations that will become apparent upon reading and understanding the present specification, the present invention discloses a method and apparatus for providing mini packet switching in IP access networks, such as IP based cellular access networks and IP telephony (IPTEL) gateway networks.

The present invention solves the above-described problems by providing a signaling scheme that establishes a connection between the source and destination node, wherein channels at each intermediate node are associated for a single end-to-end connection. This enables demultiplexing and multiplexing mini packets at intermediate nodes in a RAN and CN.

A method in accordance with the principles of the present invention includes receiving a payload at a node, the payload including a plurality of multiplexed mini packets, each mini packet having a header, wherein the header identifies a user and a connection associated therewith, demultiplexing the mini packets, analyzing the header of each mini packet to determine a processing for the mini packet and multiplexing packets having a common next hop in a new RTP payload.

Other embodiments of a method in accordance with the principles of the invention may include alternative or optional additional aspects. One such aspect of the present invention is that the analyzing further comprises identifying mini packets destined for a local user, the method further comprising transferring the mini packet to the local user.

Another aspect of the present invention is that the method further includes transmitting the new payload to the common next hop.

Another aspect of the present invention is that the analyzing the header of each mini packet to determine a processing for the mini packet further comprises updating a local channel identification table.

Another aspect of the present invention is that the updating the local channel identification table comprises updating only incoming parameters when the payload is received by a non-intermediate node.

Another aspect of the present invention is that the updating the local channel identification table comprises updating an incoming port parameter, an incoming channel identification parameter, an outgoing port parameter, an outgoing channel identification parameters, a calling user identification parameter and a called user identification parameter when the payload is received by an intermediate node.

Another aspect of the present invention is that the node is a base station.

Another aspect of the present invention is that the node is a radio network controller.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for providing mini packet switching in IP networks, such as IP based cellular access networks and IP telephony (IPTEL) gateway networks. The present invention provides a signaling scheme that establishes a connection between the source and destination node, wherein channels at each intermediate node are associated for a single end-to-end connection. This enables demultiplexing and multiplexing mini packets at intermediate nodes in a RAN and CN.

Figure 1:
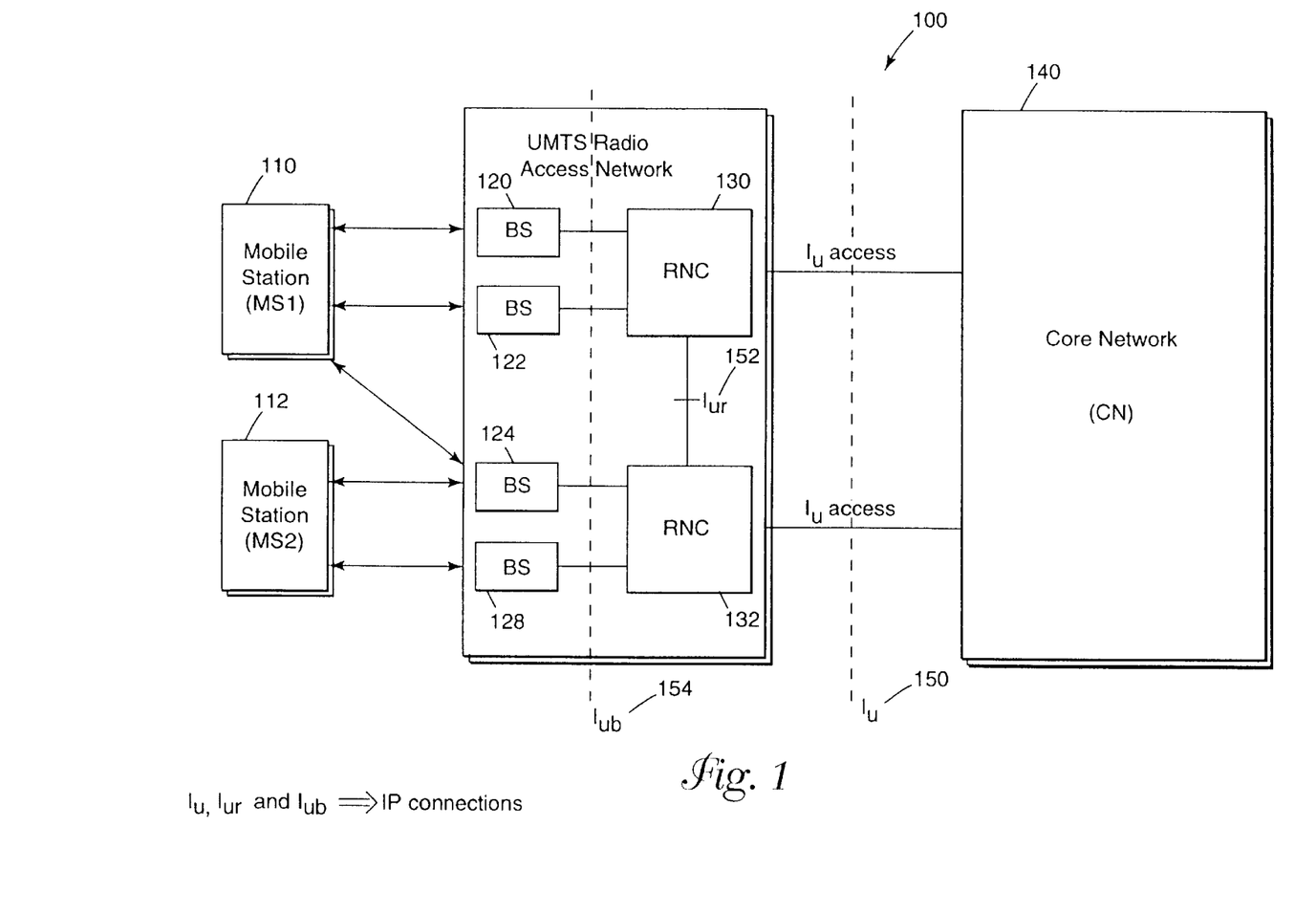
FIG. 1 illustrates a Radio Access Network (RAN) and Core Network (CN) in a cellular network.

FIG. 1 illustrates a Radio Access Network (RAN) and Core Network (CN) in a cellular network 100. In FIG. 1, Mobile Stations 110, 112 are provided with call connections via Base Stations 120, 122, 124, 128. A connection originating from a BS 120–128 is transferred through RNCs 130, 132 to the Core Network 140. The $I_u$ 150, $I_{ur}$ 152, and $I_{ub}$ 154 interfaces are Internet Protocol (IP) connections. At any given time, a number of calls are present between any two intermediate elements, e.g., RNCs 130, 132 or BSs 120–128. Although these calls originate and terminate between different nodes, it can be seen that a large number of calls share the same link between intermediate nodes. Transferring compressed speech in a single RTP/UDP connection is inefficient. The present invention eliminates this problem by demultiplexing mini packets received from incoming links and multiplexing again on different outgoing links based on their destination using mini packet controllers at nodes in the network.

Figure 2A:
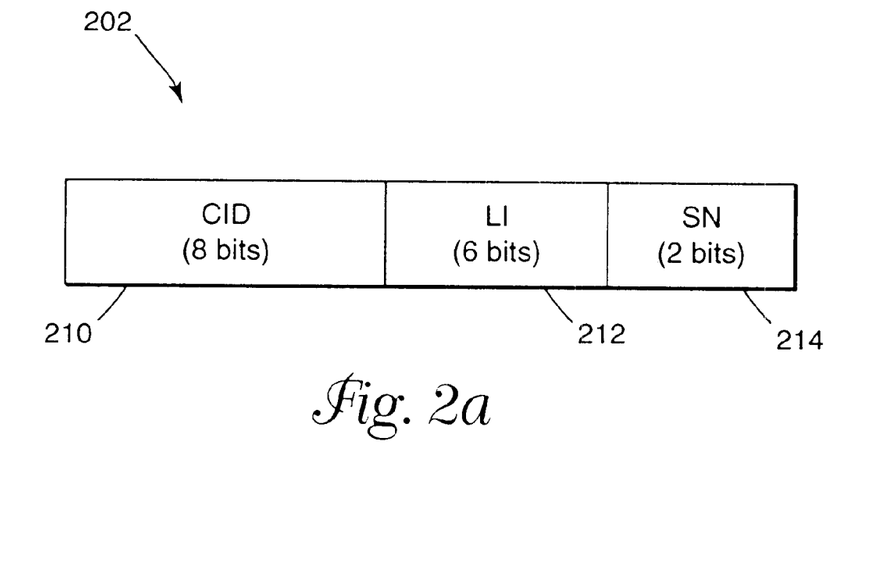
FIGS. 2a–2b illustrate MINI-IP headers for reducing header overhead.
Figure 2B:
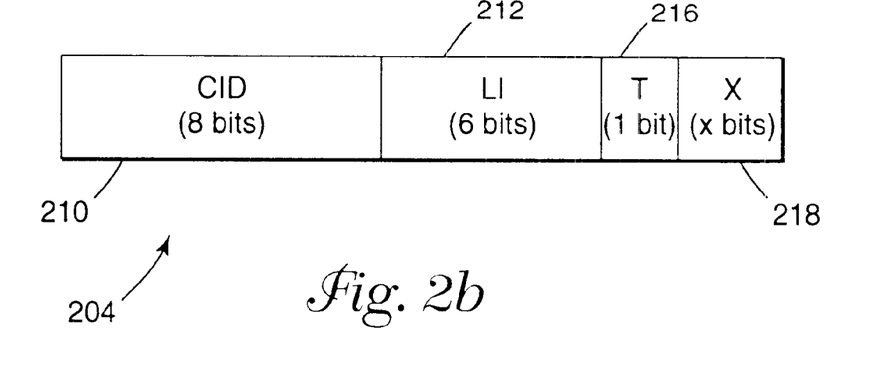
Figure 3:
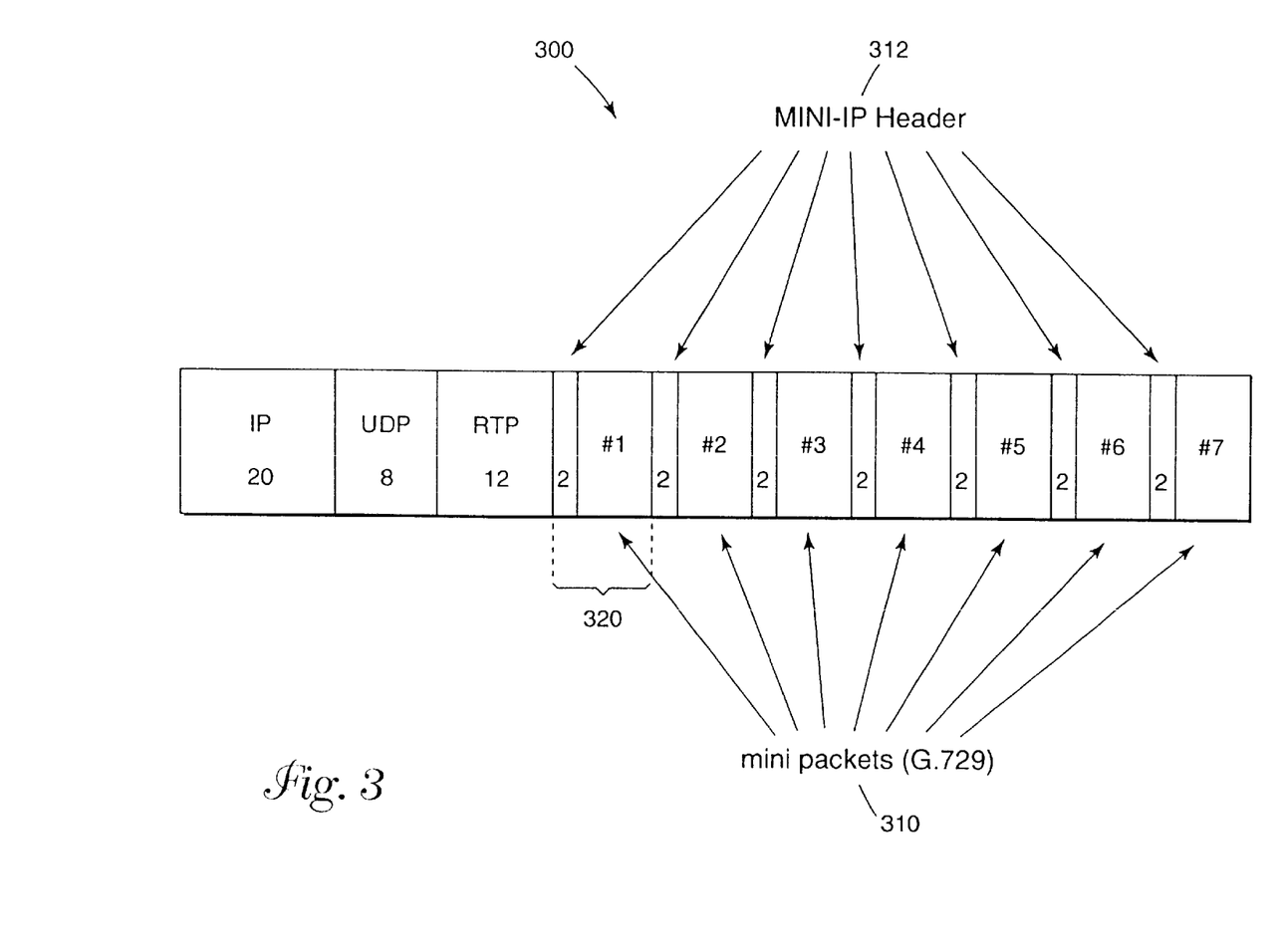
FIG. 3 illustrates an RTP payload including multiplexed mini packets.

FIGS. 2a–b and 3 illustrate the use of MINI-IP headers to reduce header overhead. MINI-IP headers provide an equal or better bandwidth efficiency without using compression. Overhead is reduced by multiplexing two or more (e.g., up to 256) low bit rate connections in a single RTP/IP/UDP connection using a MINI-IP header 202 as illustrated in FIG. 2a. Alternatively, overhead may be reduce using the MINI-IP header 204 illustrated in FIG. 2b. However, those skilled in the art will recognize that the present invention is not meant to be limited to the particular MINI-IP headers illustrated in FIGS. 2a–b, but that the MINI-IP headers 202, 204 illustrated in FIGS. 2a–b are presented for illustration only. Rather, those skilled in the art will recognize that the MINI-IP headers 202, 204 enables multiplexing of multiple small size packets, and is added to each mini packet before it is assembled with other mini packets as an RTP payload, as illustrated in FIG. 3.

A single user, among the number of users sharing the RTP connection, is identified, for example, by allocating an unique Channel Identifier (CID) which may be negotiated during connection setup. The CID negotiation procedures may be carried out by MINI-IP signaling, which uses a TCP/IP connection for reliable transport. The most suitable application scenarios for MINI-IP method include IP telephone gateways connecting PSTN/PBX/Wireless users.

Thus, mini packets multiplexed on a single RTP payload must be identified. For example, a two byte header, called MINI-IP header, may be used for each mini packet. The MINI-IP header 202, as shown in FIG. 2a includes a Channel Identifier (CID) 210, a Length Indicator (LI) 212, and a Sequence Number (SN) 214. The MINI-IP header 202 allows many users to share a single RTP/UDP/IP connection thus reducing the RTP/UDP/IP overhead per packet.

As illustrated in FIG. 2a, a MINI-IP header includes a CID field 210, which identifies a single user among users haring a single RTP/UDP/IP connection. A CID 210 is assigned at the time of the request for access to the IP network and it is unchanged throughout the connection time. The length of the CID field 210 is 8 bits, which limits the number of users per single RTP connection to 256.

The LI field 212 indicates the size of the payload (speech packet) and the 6 bits allow a maximum of 64 byte payload. The variable size of the LI field 212 allows different codecs to share a single connection and offers the flexibility to transport any low bit rate connection using MINI-IP method. The size of the LI field 212 is limited to 64 bytes since most of the codes available today (G0.723.1, G0.729) generates packets less than 20 bytes per speech sample.

The 2 bit Sequence Number (SN) field 214 is used for marking the voice packets transmitted from a single user in modulo 4 method, which can be used at the receiver to identify any packet loss. The module 4 scheme will be able to identify up to 3 consecutive packet losses at IP layer.

The MINI-IP header 204, as shown in FIG. 2b includes a Channel Identifier (CID) 210, a Length Indicator (LI) 212, a Transition bit (T) 216 and a Reserved bit (X) 218. The Channel Identification (CID) 210 in FIG. 2b is an 8 bit field which allows a maximum of 256 users to share a single RTP/UDP/IP connection. When the total number of users exceeds 256, a new RTP/UDP/IP connection is established. The LI field 212 is a 6 bit field which allows a maximum payload size of 64 bytes. The Transition bit (T) 216 is used to identify any change in processing that was applied to a mini-packet. Notification of such changes occurs by toggling the bit. Finally, the Reserved bit (X) 218 is currently undefined, but may be used, for example, as an indication of a header extension and Dual Tone Multi-Frequency (DTMF).

As mentioned above, those skilled in the art will recognize that the above illustration of MINI-IP headers is not meant to limit the invention, but that other method of identifying each user's packets could be used in accordance with the present invention. For example, the length of the fields could be modified within the 2 byte format. Further, other fields could be substituted and the length of the fields is not meant to be limited to provide a MINI-IP header of 2 bytes. For example, the reserved bit illustrated in FIG. 2b may be set to "1" to indicate an extension head is included in the MINI-IP header thereby providing an overall length for the MINI-IP header of 3 bytes. Alternatively, the reserved bit may be set to "0" to indicate that an extension header is not included in the MINI-IP header. Nevertheless, those skilled in the art will recognize that increases in the overall size of the MINI-IP header will proportionally increase the total overhead when multiple MINI-IP packets are multiplexed together in accordance with the invention. Further, those skilled in the art will recognize that any MINI-IP header that enables multiplexing of multiple small size packets, is added to each mini packet before it is assembled with other mini packets as an RTP payload as illustrated in FIG. 3, and which allows proper processing of the multiple mini packets may be used without departing from the scope of the present invention.

The assembly of mini packets into a single RTP/UDP/IP payload 300 is shown in FIG. 3. The mini packets 310 follow the RTP header 312 and each mini packet 320 is delineated by the two byte MINI-IP header 312. This approach requires a simple de-multiplexing algorithm at the receiver. Because the MINI-IP header 312 in the RTP payload 300 is transparent to the intermediate IP routers, the MINI-IP according to the present invention does not cause any problems in terms of IP packet forwarding and other functionalities at the IP layer. The traditional Header Error Controls (HEC) found in many protocols is excluded because MINI-IP relies on the higher layer checksum (UDP checksum) to protect the headers and payload from any transmission errors.

Figure 4:
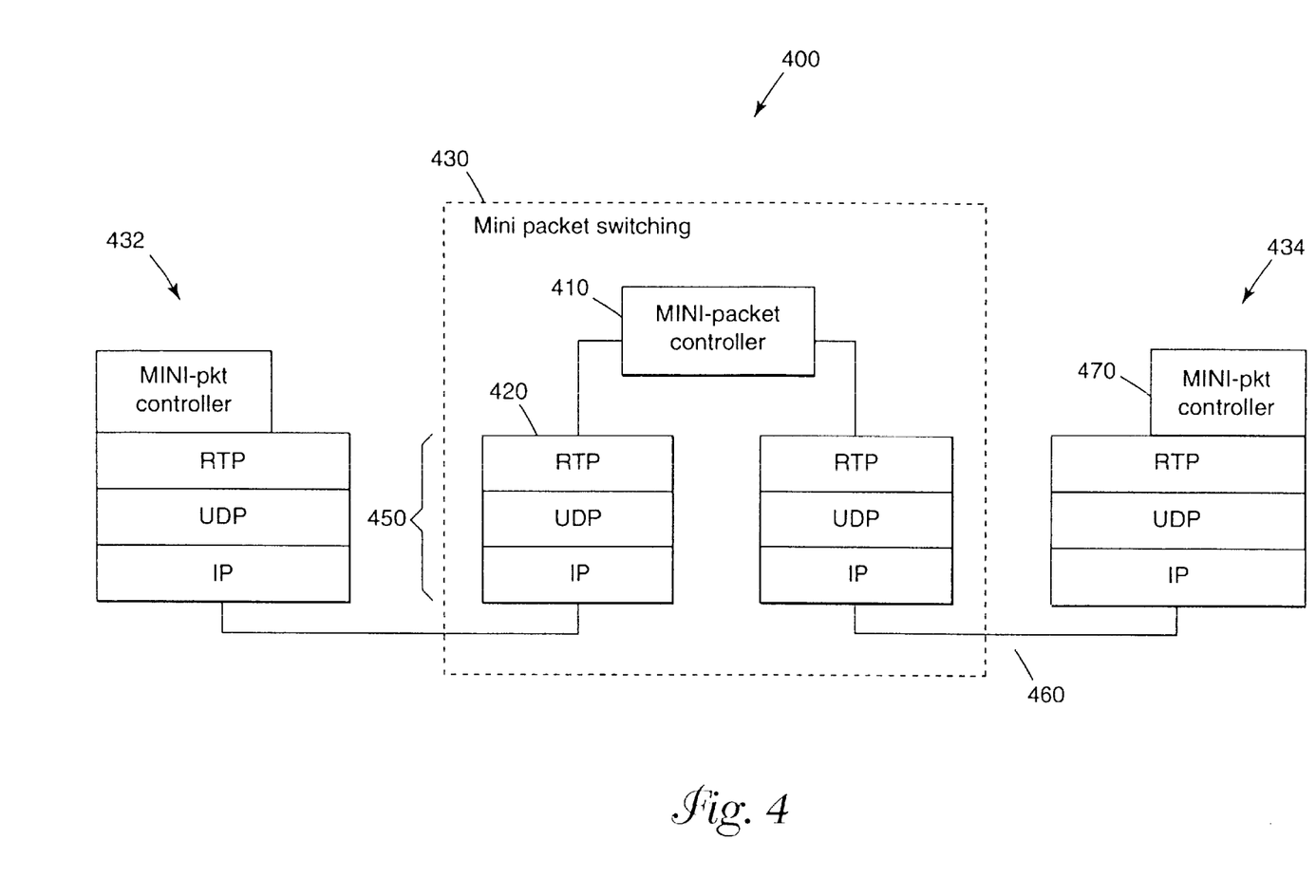
FIG. 4 illustrates a layered model wherein the mini packet switching is performed above the RTP layer.

FIG. 4 illustrates a layered model 400 wherein the mini packet switching 410 is performed above the RTP layer 420. As shown in FIG. 4, the intermediate node 430 performs the mini packet switching, while the edge nodes 432, 434 perform multiplexing and demultiplexing. An RTP payload is received from the lower layers 450 and processed at the mini packet controller 410. Once all the mini packets are deassembled and processed by the mini-packet controller 410, each packet is grouped with other packets that share the same outgoing UDP connection. RTP payload assembly is carried out at the mini packet controller 410 and then transmitted 460 to the lower layers on the next hop 434, which may be the destination node. At the destination node 434, a mini packet is deassembled from the RTP payload and passed to the user directly by the mini packet controller 410.

Figure 5:
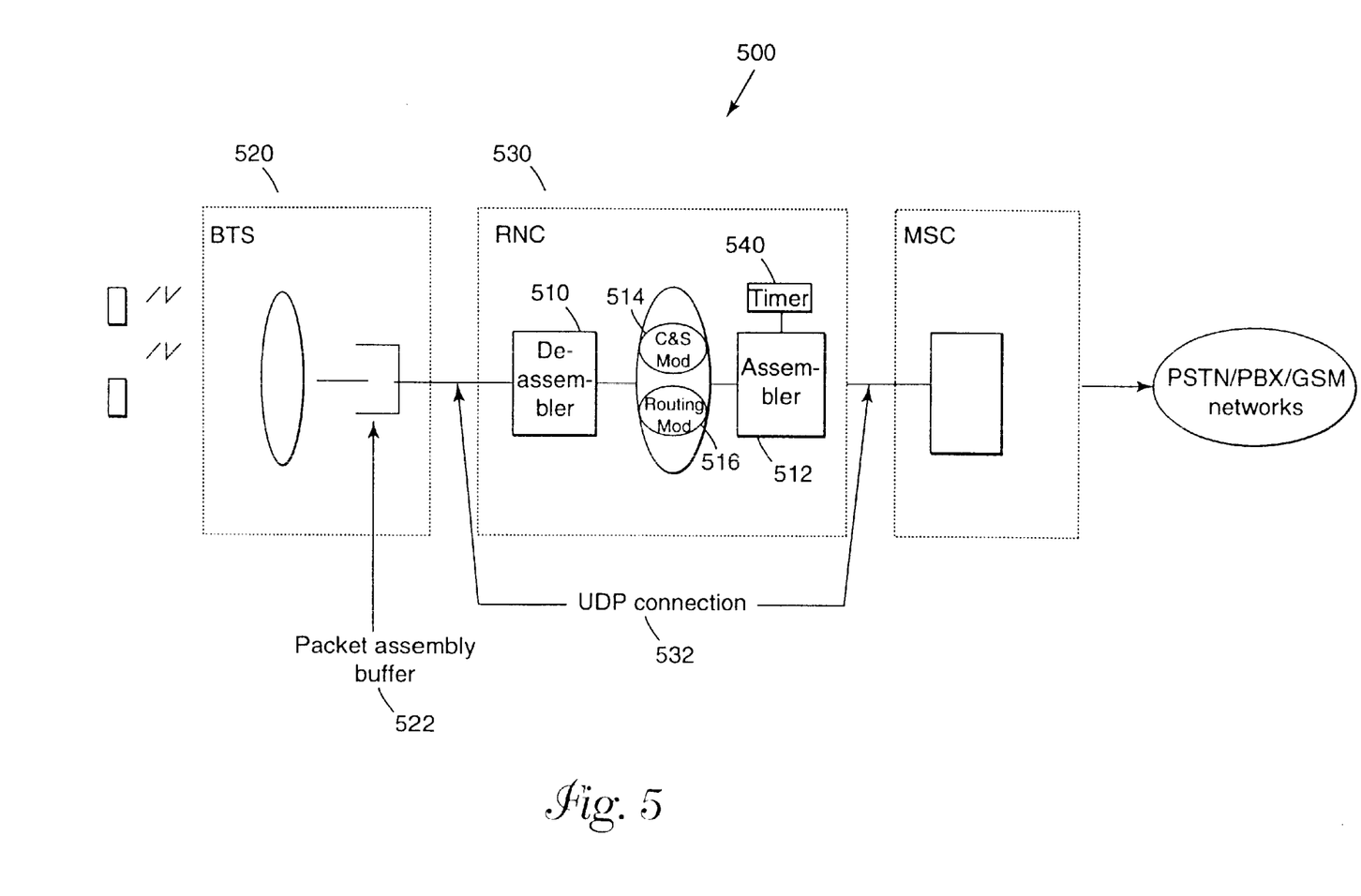
FIG. 5 illustrates the elements required for mini packet switching by a mini packet controller in a RAN.

FIG. 5 illustrates the elements required for mini packet switching by a mini packet controller in a RAN 500. Mini packet switching requires the following modules for a successful operation:

1. Demultiplexing unit 510;
2. Multiplexing unit 512;

3. Signaling or control plane 514; and
4. Routing module 516.

Calls at a BS 520 are assembled into a mini packet at a mini packet assembly buffer 522. The mini packets are then routed to a Radio Network Controller (RNC) 530 via an UDP connection 532. At the RNC 530, the demultiplexing unit 510 is responsible for receiving the RTP payload and de-assembling mini packets encapsulated within the payload. The control and signaling 514 and routing 516 modules examine the header of the mini packet and extracts the next hop (node) information. The routing module 516 passes this information along with the mini packet payload to the multiplexing unit 512. Mini packets received by the multiplexing unit 512 will then be assembled into an RTP payload with other mini packets that are destined for the same next hop. Timers 540 associated with the multiplexing unit 512 could be used to obtain a flexible trade-off between bandwidth efficiency and delay. This process continues along each node in the network, and once a mini packet reaches its destination node then it is delivered to the user.

Figure 6:
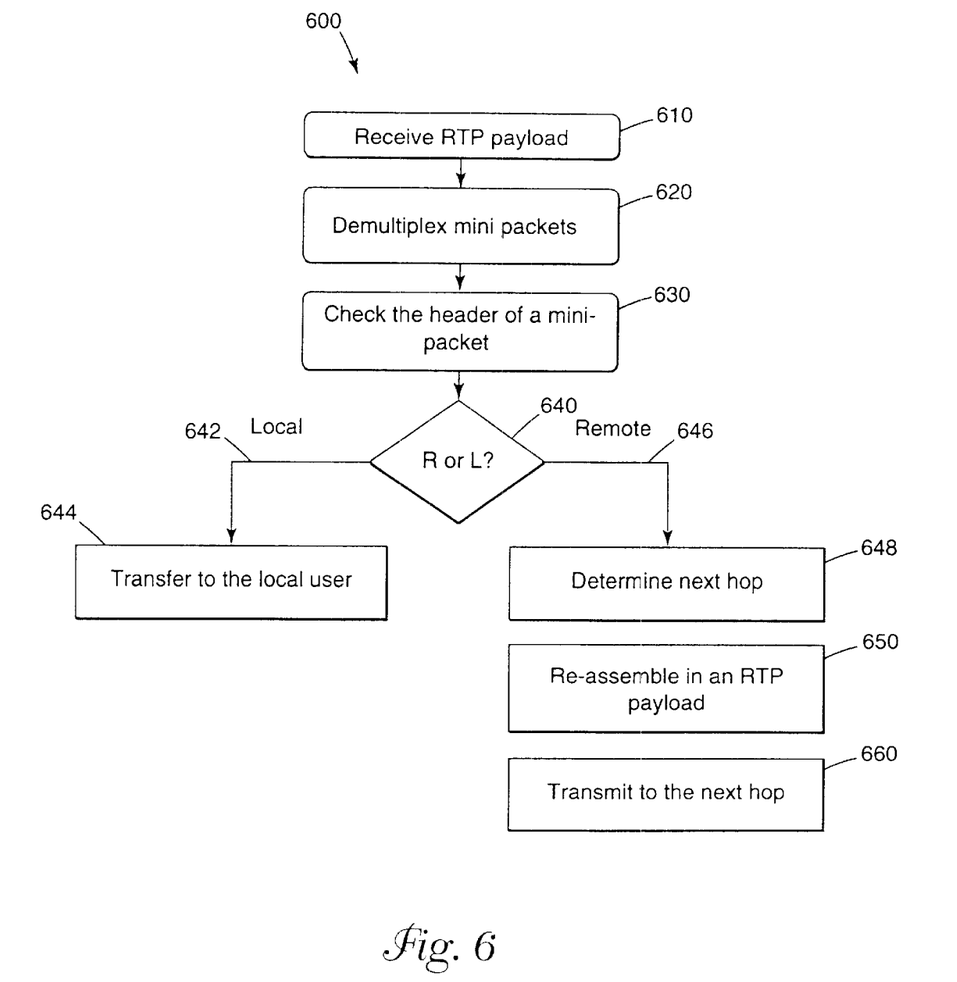
FIG. 6 illustrates a flow chart of the mini-packet switching according to the present invention.

FIG. 6 illustrates a flow chart 600 of the mini-packet switching according to the present invention. In FIG. 6, a RTP payload is received 610. The mini packets are demultiplexed 620. Then, the header of a mini packet is examined 630. A determination is made as to whether the mini packet is for a local user or a remote user 640. If the mini packet is destined for a local user 642, the mini packet is transferred to the local user 644. If the mini packet is destined for a remote user 646, the next hop for the mini packet is determined 648. The mini packet is then reassembled in an RTP payload 650 and transmitted to the next hop.

Figure 7:
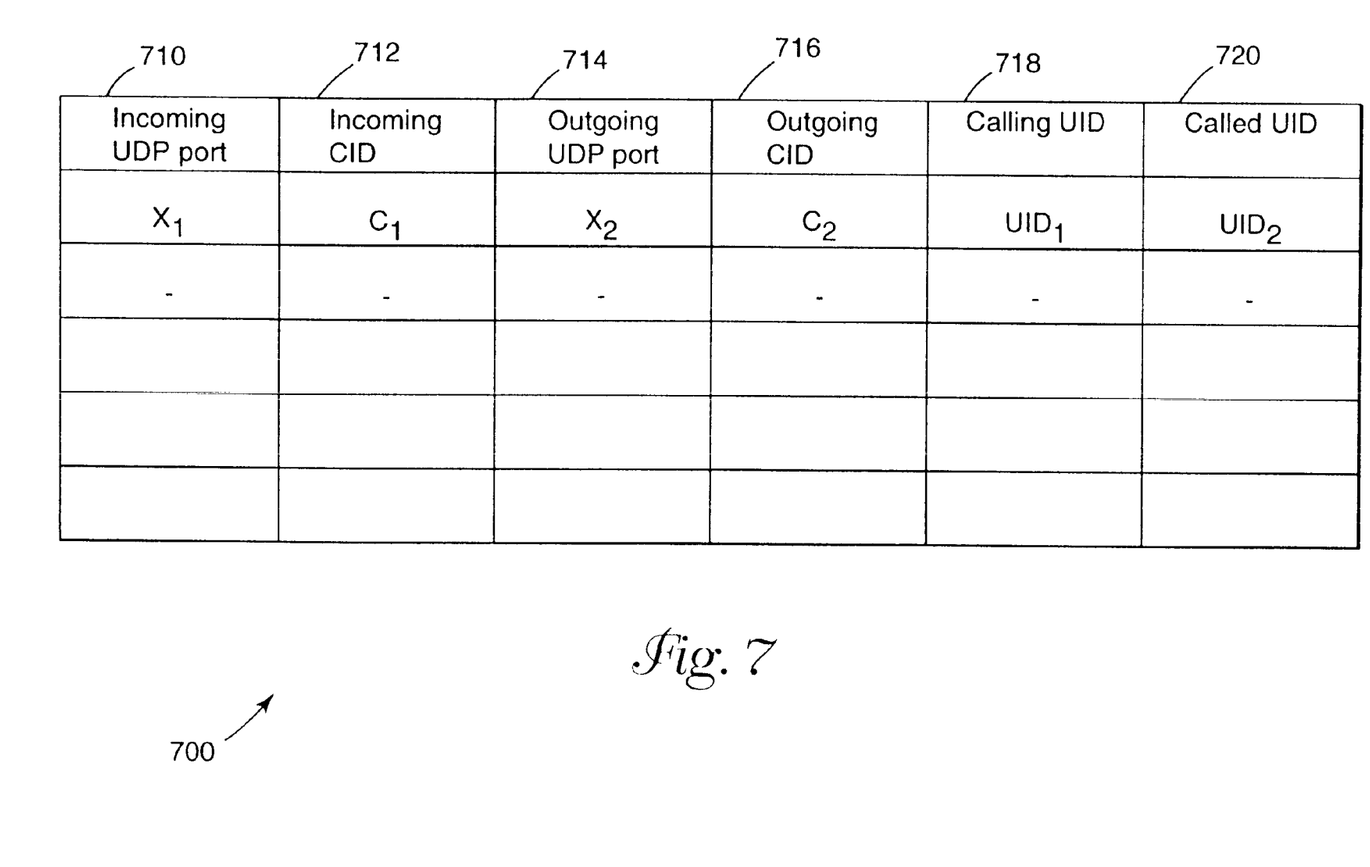
FIG. 7 illustrates a CID table that is used for signaling in a mini packet switching system according to the present invention.

FIG. 7 illustrates a CID table that is used for signaling in a mini packet switching system according to the present invention. The CID table 700 includes values for an incoming UDP port 710, an incoming CID 712, an outgoing UDP port 714, and outgoing CID 716, a calling user identification (UID) 718, and a called UID 720 and possibly other parameters. In order for the mini packet switching scheme to be functional, a signaling mechanism is needed. The control signaling protocol is responsible for establishing a connection from the source to the destination through a set of nodes. The signaling according to the present invention is similar to the signaling used in ATM, PSTN and IP telephony gateway networks.

A node receiving a setup message performs the necessary operations to establish a connection. These operations include, updating the local CID table 700 with the incoming UDP connection 710, incoming CID 712, user Ids 718, 720, outgoing UDP connection 714, and outgoing CID 716. If the node is not an intermediate node then it updates only the incoming part of the CID table, such as the incoming UDP port 710 and the incoming CID 712. The outgoing part contains the destination user information.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing mini packet switching in IP networks, comprising:
   receiving a payload at a node, the payload including a plurality of multiplexed mini packets, each mini packet having a header, wherein the header identifies a user and a connection associated therewith;
   demultiplexing the mini packets;
   analyzing the header of each mini packet to determine a processing for the mini packet; and
   multiplexing packets having a common next hop in a new RTP payload.

2. The method of claim 1 wherein the analyzing further comprises identifying mini packets destined for a local user, the method further comprising transferring the mini packet to the local user.

3. The method of claim 1 further comprising transmitting the new payload to the common next hop.

4. The method of claim 1 wherein the analyzing the header of each mini packet to determine a processing for the mini packet further comprises updating a local channel identification table.

5. The method of claim 4 wherein the updating the local channel identification table comprises updating only incoming parameters when the payload is received by a non-intermediate node.

6. The method of claim 4 wherein the updating the local channel identification table comprises updating an incoming port parameter, an incoming channel identification parameter, an outgoing port parameter, an outgoing channel identification parameters, a calling user identification parameter and a called user identification parameter when the payload is received by an intermediate node.

7. The method of clam 1 wherein the node is a base station.

8. The method of claim 1 wherein the node is a radio network controller.

9. A mini packet controller for providing mini packet switching in IP networks, comprising:
   a demultiplexer for receiving a payload, the payload including a plurality of multiplexed mini packets, each mini packet having a header, wherein the header identifies a user and a connection associated therewith, the demultiplexer demultiplexing the mini packets;
   a control and signaling module for analyzing the header of each mini packet to determine a processing for the mini packet; and
   a multiplexer for multiplexing packets having a common next hop identified by the control and signaling module in a new RTP payload.

10. The mini packet controller of claim 9 wherein the control and signal module identifies mini packets destined for a local user and transfers the mini packet to the local user.

11. The mini packet controller of claim 9 wherein the control and signaling module transmits the new payload to the common next hop.

12. The mini packet controller of claim 9 wherein the control and signaling module updates a local channel identification table.

13. The mini packet controller of claim 12 wherein the control and signaling module updates only incoming parameters when the payload is received at a non-intermediate node.

14. The mini packet controller of claim 12 wherein the control and signaling module updates an incoming port parameter, an incoming channel identification parameter, an outgoing port parameter, an outgoing channel identification parameters, a calling user identification parameter and a called user identification parameter when the payload is received by an intermediate node.

15. A radio network controller, comprising a mini packet controller for providing mini packet switching in IP based cellular access network, the mini packet controller further including a demultiplexer for receiving a payload, the payload including a plurality of multiplexed mini packets, each mini packet having a header, wherein the header identifies a user and a connection associated therewith, the demultiplexer demultiplexing the mini packets, a control and signaling module for analyzing the header of each mini packet to determine a processing for the mini packet and a multiplexer for multiplexing packets having a common next hop identified by the control and signaling module in a new RTP payload.

16. The radio network controller of claim 15 wherein the control and signal module identifies mini packets destined for a local user and transfers the mini packet to the local user.

17. The radio network controller of claim 15 wherein the control and signaling module transmits the new payload to the common next hop.

18. The radio network controller of claim 15 wherein the control and signaling module updates a local channel identification table.

19. The radio network controller of claim 18 wherein the control and signaling module updates only incoming parameters when the payload is received at a non-intermediate node.

20. The radio network controller of claim 18 wherein the control and signaling module updates an incoming port parameter, an incoming channel identification parameter, an outgoing port parameter, an outgoing channel identification parameters, a calling user identification parameter and a called user identification parameter when the payload is received by an intermediate node.

21. A base station, comprising a mini packet controller for providing mini packet switching in IP based cellular access network, the mini packet controller further including a demultiplexer for receiving a payload, the payload including a plurality of multiplexed mini packets, each mini packet having a header, wherein the header identifies a user and a connection associated therewith, the demultiplexer demultiplexing the mini packets, a control and signaling module for analyzing the header of each mini packet to determine a processing for the mini packet and a multiplexer for multiplexing packets having a common next hop identified by the control and signaling module in a new RTP payload.

22. The base station of claim 21 wherein the control and signal module identifies mini packets destined for a local user and transfers the mini packet to the local user.

23. The base station of claim 21 wherein the control and signaling module transmits the new payload to the common next hop.

24. The base station of claim 21 wherein the control and signaling module updates a local channel identification table.

25. The base station of claim 24 wherein the control and signaling module updates only incoming parameters when the payload is received at a non-intermediate node.

26. The base station of claim 24 wherein the control and signaling module updates an incoming port parameter, an incoming channel identification parameter, an outgoing port parameter, an outgoing channel identification parameters, a calling user identification parameter and a called user identification parameter when the payload is received by an intermediate node.

* * * * *